INVENTOR.
Donald E. Walsh
BY Paul Fitzpatrick
ATTORNEY

United States Patent Office 3,537,258
Patented Nov. 3, 1970

3,537,258
REGENERATOR CONTROL
Donald E. Walsh, Aurora, Ill., assignor to General Motors Corporation, Detroit, Mich., a corporation of Delaware
Filed Sept. 6, 1968, Ser. No. 758,038
Int. Cl. F02c 7/10
U.S. Cl. 60—39.51                            10 Claims

ABSTRACT OF THE DISCLOSURE

In a regenerative gas turbine engine in which the regenerator matrix is driven fractionally, means are provided to detect undue slippage between the matrix drive and the matrix. The detecting means may operate a signal, shut down the engine, and declutch the matrix drive.

---

My invention is directed to controls for regenerative gas turbine engines and particularly to safety controls for an engine with a frictionally driven regenerator matrix.

U.S. Pat. No. 3,455,107 of Addie, Dixon, McDowall, and Oestrike for Gas Turbine Engine, discloses a regenerative gas turbine engine particularly adapted for locomotive service. U.S. Pat. No. 3,384,156 of Addie for Rotary Regenerator, patented May 21, 1968, discloses regenerator supporting, driving, and sealing arrangements for such an engine. In that engine, heat transfer between compressor discharge air and turbine exhaust gases is effected by regenerator structure including two radial flow matrix drums of relatively large size which are supported on rollers and which are driven frictionally by one roller at each regenerator matrix. The matrix is rotated slowly upon its axis at a rate of some two to five seconds for each revolution by gearing which connects it to the compressor and compressor driving turbine of the engine. This gearing involves a large reduction in speed from the turbine speed to that of the matrix drive roller which may, for example, be about nine times the speed of the matrix.

As disclosed in the prior application, a disconnectable clutch is provided in the drive line from the turbine to the matrix so that, if the matrix should seize or stick, the drive can be decoupled.

With a positive gear drive of the matrix, there is not the problem of possible slippage which exists with the friction drive. However, there may be considerable destruction if the matrix jams due to warpage or breakage of a sheet metal part of the matrix. The friction drive has substantial advantages for which it is adopted in the engine described in the aforementioned patents. If, because of some warping or failure of some part the matrix should encounter undue resistance to rotation, the natural result will be slipping of the friction drive between the drive roller and the matrix. Slippage can result in rapid uneven wear of the matrix and also can result in distortion of the matrix because of uneven heating and cooling, as well as possible harm to the turbine of the engine.

Thus, it becomes important to provide means for detecting and responding to any failure of the matrix to rotate properly which will be reflected by an increase in slip between the drive and the matrix. My invention is directed to provision of means for detecting and responding to such slip by sounding an alarm or, preferably, by actuating means to declutch the matrix drive and shut down the engine by cutting off the fuel supply to the engine combustion apparatus.

The principal objects of my invention are to provide a safety control or signal to indicate cessation or slowdown of operation of a rotary regenerator; to provide means for shutting down a regenerative engine upon failure of the regenerator; to provide a control particularly suited to the requirement of a regenerative gas turbine engine for indicating failure of operation of the regenerator and for declutching the regenerator or shutting down the engine upon such failure or incipient failure.

A subsidiary object of my invention is to provide suitable means to compare speed of two devices which operate at relatively low speed and to respond to a predetermined discrepancy in the speeds of the devices.

The manner in which such objects are achieved and the nature and advantages of my invention will be apparent to those skilled in the art from the succeeding detailed description of preferred embodiments of the invention and the accompanying drawings thereof.

Figure 1:
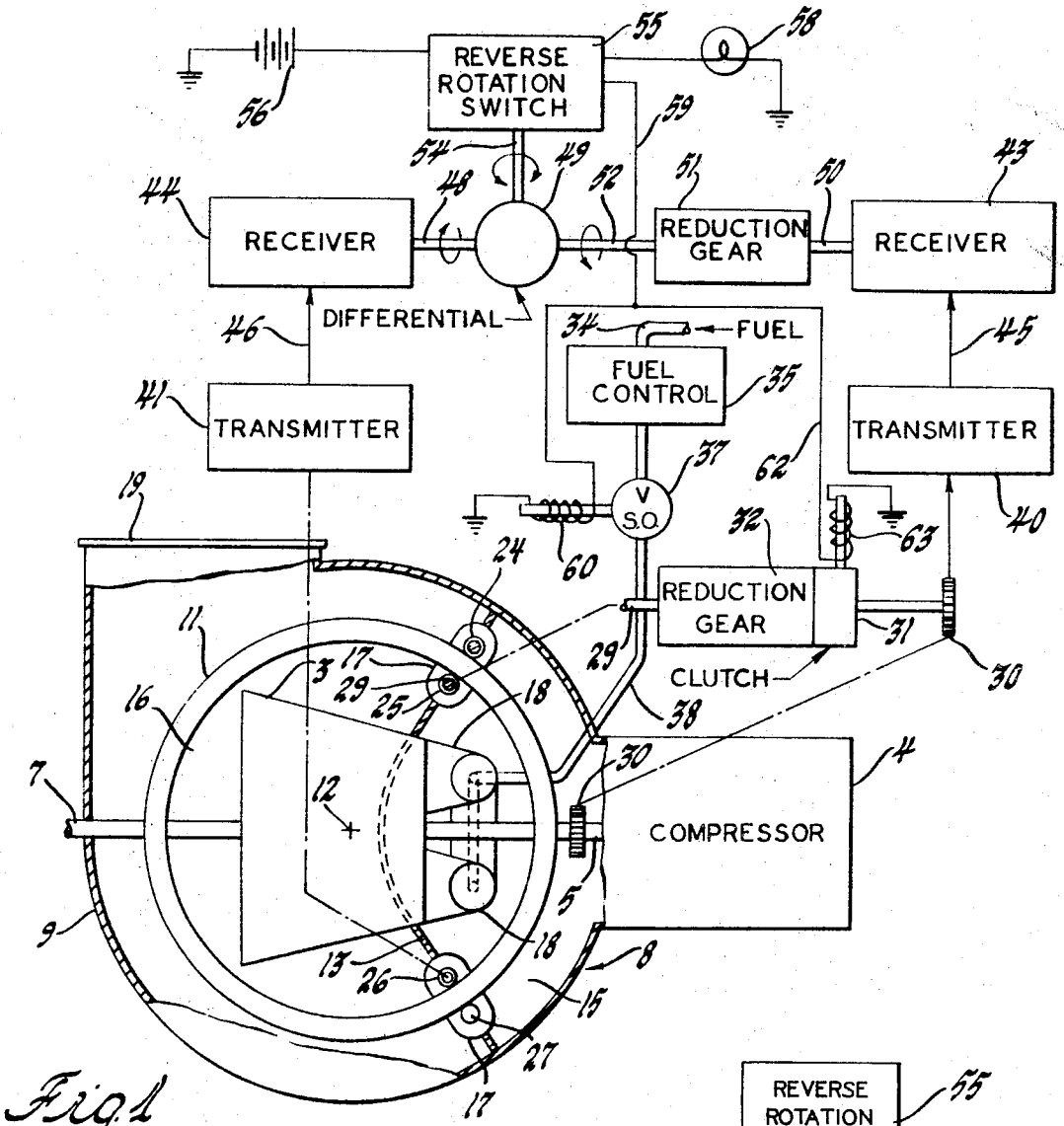
FIG. 1 is a schematic diagram of a regenerator slip control system applied to a gas turbine engine.

It may be best to begin with a brief description of the gas turbine engine shown schematically in FIG. 1, which is the subject of the above-mentioned patents. It will be understood, of course, that my invention is applicable to other power plants, but the one of FIG. 1 is that for which it is primarily intended.

The engine of FIG. 1 includes turbine means 3 which drives a compressor 4 through a shaft 5 and also drives a power output shaft 7. The compressor supplies air to a regenerator 8 which comprises a regenerator case or housing 9 and two coaxial drum-shaped regenerator matrices 11 which rotate upon a common axis perpendicular to the turbine axis and indicated at 12. A bulkhead 13 divides the interior of the regenerator case between a high pressure chamber 15 into which the compressor discharges and a low pressure chamber 16 into which the turbine discharges. Main support and seal assemblies 17 are mounted in the bulkhead at the places where each drum passes through the bulkhead as it is slowly rotated about the axis 12. Air compressed by the compressor flows radially inwardly through the forward roughly 120° sector of the matrix, into and through combustion apparatus 18 disposed between the matrix and the bulkhead, and thence through the turbine means. The turbine exhaust flows radially outward through the sector of the matrix aft of the bulkhead to an exhaust stack 19.

The matrix is located by rollers 24, 25, 26, and 27, rollers 25 and 26 engaging the interior surface of the matrix rim and rollers 24 and 27 bearing against the outer surface of the matrix rim. The matrix is pressed against rollers 25 and 26 by gas pressure and by means which bias rollers 24 and 27 towards the matrix. All these rollers are idlers except roller 25, which is driven by a shaft 29 and which in turn frictionally rotates the matrix 11. Matrix driving shaft 29 is driven from engine shaft 5 through gearing indicated at 30, a disengageable clutch 31, and a reduction gear 32. Where two matrices are provided they may both be driven by the same clutch and reduction gear, the shaft 29 being connected to the drive rollers 25 of both matrices.

Fuel to energize the engine is supplied from any suitable source of fuel under pressure indicated at 34 through a fuel control 35 of suitable type, a shutoff valve 37, and a conduit 38 to the combustion apparatus 18 which may have any suitable fuel nozzles (not illustrated).

Proceeding now to the safety control which is the subject of my invention, it may be summerized briefly by stating that it involves means for transmitting a sense of rotation of each of the drive roller 25 and matrix 11 and comparing the two sensed motions to determine if there is a departure from synchronism above a tolerable level. In general, a small amount of slip is to be expected in any friction drive. Assuming, for example, that normal slip would be two percent, a value slightly higher, such, for example, as five percent slip, can be taken as a point of discrimination between normal operation and partial or total failure of the matrix or its drive. Thus, by setting some predetermined value such as five percent slip as the amount which will be detected by the means which compares the relative speeds of the matrix drive and matrix, a signal to warn of trouble or means to shut down the engine and cut out the matrix drive may be energized.

Since the speed of the parts is relatively low, the normal full speed of the matrix being about twenty-five revolutions per minute and that of the drive roller about nine times that, it is deemed preferable to transmit indications of motion or rotary displacement rather than of angular velocity. However, transmission and comparison of angular velocity is not impossible. It is feasible to transmit motion by various types of devices of a mechanical or electrical nature which have no systematic error, whereas a speed transmitter ordinarily has some error, and the relative error may become greater where the speeds involved are quite low. Also, direct transmission of rotary displacement involves simpler and less expensive mechanisms.

It appears that the most feasible means for transmitting and comparing the rotation of the matrix and its drive is a simple electrical step by step transmitter and receiver for each, these being coupled reversely to a differential gear so that the output of the differential gear represents the difference of the two. The gearing between the inputs and the final outputs are such that the differential gear output is stationary when the slip is just below the value at which actuation of the output is desired. For example, if the input from the matrix drive to the differential moves five percent faster with zero slip than the input from the matrix, the output of the differential ordinarily will move forward, its motion being less relative to the inputs as the slip increases and finally reversing at the value of slip of five percent. Such reversal can readily be detected by numerous devices, one of the simplest being a conventional reverse rotation switch.

Proceeding now to a detailed description of the preferred slip sensitive system, a transmitter 40 which may be called the input transmitter is driven off shaft 5 through gearing 30. The motion of the matrix is communicated by a transmitter 41 which may be called a feedback transmitter. The most feasible and convenient means for driving transmitter 41 is to couple it to one of the idler rollers, preferably roller 26 which is constantly loaded by pressures against the matrix. It would also be possible to drive off idler roller 24 or 27 but less desirable. Any suitable gearing or flexible shafting may connect roller 26 to transmitter 41.

Transmitters 40 and 41 may be any suitable motion transmitter such as a switch closed at each rotation or at some definite amount of rotation of the transmitter input, or any step-by-step or self-synchronous transmitter. The transmitters 40 and 41 are connected to receivers 43 and 44. In the preferred embodiment, the receivers are step-by-step motors such as stepping solenoid actuators, but they may be other suitable step-by-step or self-synchronous devices compatible with the transmitters operated by the transmitters through wiring connections 45 and 46. Receiver 44 operates a feedback shaft 48 which is one input to a differential 49. Receiver 43 drives through a shaft 50 and a reduction gear 51 the other input shaft 52 of the differential. The reduction gear 51 is provided partly because it is assumed that the gearing 30 to transmitter 40 may be operating at considerably higher speed than the idler roller 26 and transmitter 41. It would be equally feasible to put the reduction gear between gearing 30 and the transmitter if desired. In any event, gearing somewhere in the system is required to harmonize the speeds of shafts 52 and 48 so that these speeds are the same when the slip between the drive and the matrix is the predetermined critical level.

Thus, assuming a slight normal slip, the shaft 52 will normally be rotated several percent faster than shaft 48. Since the drives of these shafts into the differential are such as to subtract from each other, the differential output shaft 54 operates at the difference between the speeds of shaft 52 and shaft 48. Shaft 54 drives a reverse rotation switch 55 which may be assumed to be normally open and to be closed upon reverse rotation of shaft 54. Such devices are well known. In the event the transmission is of a stepping nature, the reverse rotation switch for the differential should have provision for sufficient lost motion that a given step of device 43 does not actuate the switch, but such actuation occurs only upon consistent reverse rotation of shaft 54. Reverse rotation switch is connected to a suitable source of current indicated on the drawing by the battery 56 and is capable of energizing or deenergizing external circuits. As illustrated, the switch is connected to energize a warning signal 58 which may be a lamp or audible signal and is also connected through a lead 59 to a solenoid 60 which actuates the fuel shutoff valve 37. Assuming that the switch energizes the circuit, the valve should be a normally open valve closed by the solenoid. Of course, the system may be the other way around in which the switch deenergizes lead 59 upon excess slip, at which case the valve should be normally closed and opened by the solenoid. Lead 59 is also connected through a branch lead 62 with a solenoid 63 which acts to disengage the clutch upon excess slip, either through being energized or being deenergized by switch 55. Suitable electrically actuated clutches are readily available. Solenoid 63 may operate the clutch directly or control an air or hydraulic circuit which disengages the clutch.

It will be apparent, of course, that a direct mechanical transmission from shaft 5 and roller 26 to the differential 49 through suitable gearing is possible and thus the electrical transmission may be dispensed with. However, the electrical transmission provides a convenient and preferred means to transmit motion from the engine to a control device such as reverse rotation switch 55.

Figure 2:
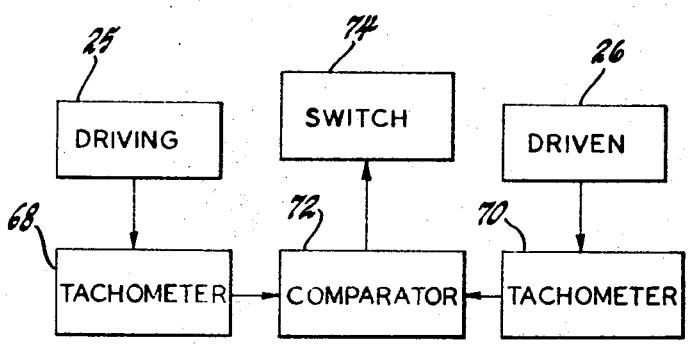
FIG. 2 is a partial schematic diagram of a different type of rotation responsive system.

It is further apparent that various types of comparison devices other than differential 49 may be employed. For example, in FIGURE 2 a system is illustrated in which the transmitter is of a sort in which the magnitude of a signal such as a voltage or pulse duration increases with the rate of rotation of the device which drives the transmitter, this being any suitable electrical tachometer. Thus FIG. 2 shows the driving device which may be considered to be the driving roller 25 or something connected to it and the driven device which may be the idler roller 26. Each of these drives a tachometer 68 or 70 of suitable character and both tachometers transmit their outputs to a comparator 72. This is a device to compare the relative outputs of the two tachometers to determine the difference or ratio of speeds. It may be sensitive to a difference of output or to a ratio of outputs. The comparator then operates the switch or relay 74 or any other device which operates to warn of slip or shut down the engine.

Figure 3:
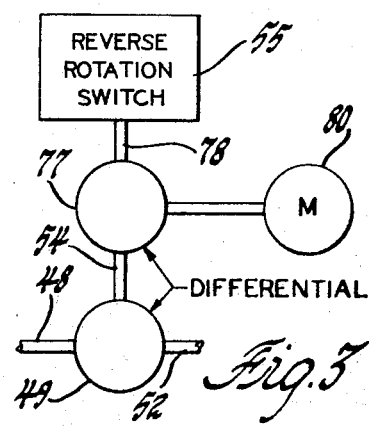
FIG. 3 is a partial schematic diagram of a modification of FIG. 1.

FIG. 3 illustrates the addition of means to the system of FIG. 1 to cause switch 55 to respond to a difference of speeds of the matrix and its drive instead of, or in addition to, the critical ratio of speeds which controls in FIG. 1.

The device of FIG. 3 involves simply the addition of a second subtracting differential gear 77 between shaft 54 and the reverse rotation switch input shaft 78 and a small low speed motor such as a clock motor 80 with an input to the differential. In this case, switch 55 is operated whenever the shaft 54 turns faster than the input from motor 80 can compensate for. Thus, the device responds to a definite r.p.m. of slip rather than a ratio if the output of differential 49 is zero for zero slip, which it may be if the gearing is so proportioned. As stated, a combination of ratio and difference control may be used.

It is preferable for transmitter 40 to be connected to the matrix drive ahead of the clutch, since otherwise a lock-in for the safety circuits would be required.

It will be seen that the system according to the invention provides a very simple, reliable, and effective means to detect slip in the regenerator drive and thereby any unusual resistance to the motion of regenerator and it is effective to warn the operator or shut down the engine so as to prevent continued operation of the engine with possible further damage to the regenerator. In one case, the slip detector proved its usefulness by detecting underspeed of the matrix resulting from failure of a bearing for one of the matrix support rollers, thus preventing further damage to the regenerator.

The detailed description of the preferred embodiment of the invention for the purpose of explaining the principles thereof is not to be considered as limiting or restricting the invention, as many modifications may be made by the exercise of skill in the art.

What is claimed is:

1. A power plant including a regenerator having a rotating heat transfer matrix and means for driving the matrix including power supplying means and a friction drive acting on the matrix comprising, in combination, first means responsive to rotation of the friction drive, second means responsive to rotation of the matrix, a comparison device connected to the first and second means operative to detect slip between the drive and matrix, slip rseponsive means operated by the comparison device upon occurrence of a predetermined degree of slip, and means operated by the slip responsive means effective to terminate the drive of the matrix upon occurrence of the predetermined degree of slip.

2. A power plant as recited in claim 1 including a clutch between the power supplying means and the friction drive operable to terminate the drive.

3. A power plant as recited in claim 1 including means for supplying fuel to the power supplying means for energization thereof and in which the last-recited means is coupled to the fuel supplying means to shut off the fuel.

4. A power plant as recited in claim 1 in which the comparison device detects a slip magnitude.

5. A power plant as recited in claim 1 in which the comparison device detects a slip ratio.

6. A power plant as recited in claim 1 in which the comparison device detects a combination of slip magnitude and slip ratio.

7. A regeneration gas turbine power plant comprising, in combination, a compressor, combustion apparatus supplied thereby, turbine means energized from the combustion apparatus, drive means connecting the turbine means to the compressor, a regenerator including a rotating matrix disposed for heat exchange between compressor discharge air and the turbine exhaust, a friction drive means connecting the turbine means to the matrix to rotate the matrix, means coupled to the drive means and to the matrix operative to measure the degree of slip between the drive means and the matrix, means operated by the measuring means responsive to a predetermined degree of slip between the drive means and the matrix, and means operated by the slip responsive means effective to terminate the drive of the matrix upon occurrence of the predetermined degree of slip.

8. A power plant as recited in claim 7 in which the drive-terminating means includes means to disable the drive means connecting the turbine means to the matrix.

9. A power plant as recited in claim 7 in which the drive-terminating means includes means to shut down the power plant.

10. A power plant as recited in claim 7 including means for supplying fuel to the combustion apparatus and means actuated by the drive-terminating means to shut off the fuel.

References Cited

UNITED STATES PATENTS

| 887,616 | 5/1908 | Field _____ 73—507 |
|---|---|---|
| 2,705,615 | 4/1955 | Rigby _____ 73—507 XR |
| 3,267,674 | 8/1966 | Collman et al. |

CARLTON R. CROYLE, Primary Examiner

U.S. Cl. X.R.

165—8; 73—507